(12) United States Patent
Sato (10) Patent No.: US 10,017,162 B2
(45) Date of Patent: Jul. 10, 2018

(54) DEVICE FOR HEATING WASHER FLUID

(71) Applicant: MURAKAMI CORPORATION, Shizuoka (JP)

(72) Inventor: Hidenori Sato, Shizuoka (JP)

(73) Assignee: MURAKAMI CORPORATION, Shizuoka (JP)

(*) Notice: Subject to any disclaimer, the term of this patent is extended or adjusted under 35 U.S.C. 154(b) by 0 days.

(21) Appl. No.: 15/527,763

(22) PCT Filed: Nov. 19, 2015

(86) PCT No.: PCT/JP2015/082602
§ 371 (c)(1),
(2) Date: May 18, 2017

(87) PCT Pub. No.: WO2016/088572
PCT Pub. Date: Jun. 9, 2016

(65) Prior Publication Data
US 2017/0320469 A1 Nov. 9, 2017

(30) Foreign Application Priority Data
Dec. 2, 2014 (JP) ................................ 2014-244323

(51) Int. Cl.
*A47J 27/00* (2006.01)
*F24H 1/20* (2006.01)
(Continued)

(52) U.S. Cl.
CPC ..................................... *B60S 1/487* (2013.01)

(58) Field of Classification Search
None
See application file for complete search history.

(56) References Cited

U.S. PATENT DOCUMENTS 1,873,820 A 8/1932 Carpenter
3,962,560 A 6/1976 Braathen
(Continued)

FOREIGN PATENT DOCUMENTS

GB 2454689 5/2009
JP 63-305060 12/1988
(Continued)

OTHER PUBLICATIONS

Search Report issued in Japan Patent Application No. PCT/JP2015/082602, dated Jan. 12, 2016.
(Continued)

*Primary Examiner* — Thor Campbell
(74) *Attorney, Agent, or Firm* — Greenblum & Bernstein, P.L.C.

(57) ABSTRACT

A washer fluid heating device includes a container that contains a washer fluid, a lid portion attached to a first end of the container in a direction of a central axis line O to face an accommodation space for the washer fluid, heating means that has a proximal end portion attached to the lid portion and extends toward the accommodation space, and an outflow pipe having an outlet disposed in the accommodation space, the outlet is provided between a distal end surface of the heating means and a second end opposite to the first end of the container, and a region obtained by projecting the outlet onto a virtual plane perpendicular to the direction of the central axis line O of the container at least partially overlaps a region obtained by projecting the distal end surface of the heating means onto the virtual plane.

10 Claims, 7 Drawing Sheets

(51) Int. Cl.
*F24H 1/18* (2006.01)
*B60S 1/48* (2006.01)

(56) References Cited

U.S. PATENT DOCUMENTS

| | | | | | |
|---|---|---|---|---|---|
| 4,508,957 | A | * | 4/1985 | Rocchitelli | B60S 1/481 137/341 |
| 4,514,617 | A | * | 4/1985 | Amit | F24H 1/20 122/18.4 |
| 4,637,347 | A | * | 1/1987 | Troy | F24D 3/082 122/15.1 |
| 5,848,636 | A | * | 12/1998 | Chuang | F28D 7/06 165/161 |
| 5,957,384 | A | * | 9/1999 | Lansinger | B60S 1/481 219/202 |
| 5,979,796 | A | * | 11/1999 | Ponziani | B60S 1/488 219/202 |
| 6,321,036 | B1 | | 11/2001 | Huang | |
| 6,839,509 | B2 | * | 1/2005 | Kuebler | B60S 1/488 137/334 |
| 7,588,194 | B2 | * | 9/2009 | Shank | B05B 9/002 239/130 |
| 7,657,961 | B2 | * | 2/2010 | Shank | B05B 9/002 15/250.01 |
| 7,673,814 | B2 | * | 3/2010 | Shank | B05B 9/002 219/202 |
| 7,959,090 | B2 | * | 6/2011 | Shank | B05B 9/002 239/130 |
| 2012/0183281 | A1 | | 7/2012 | Sato et al. | |

FOREIGN PATENT DOCUMENTS

| | | |
|---|---|---|
| JP | 2-70557 | 3/1990 |
| JP | 5536680 | 5/2014 |
| WO | 2007/010538 | 1/2007 |

OTHER PUBLICATIONS

English translation of International Preliminary Report on Patentability received in PCT/JP2015/082602, dated Jun. 15, 2017.

* cited by examiner

DEVICE FOR HEATING WASHER FLUID

TECHNICAL FIELD

The present invention relates to a washer fluid heating device.

BACKGROUND ART

Conventionally, a washer fluid heating device has been mounted on a vehicle, etc. to remove frost in winter. For example, Patent Literature 1 describes a washer fluid heating device having a structure in which a heating chamber is accommodated in a heat-retaining hot water storage chamber and an electric heater is accommodated inside the heating chamber. In the heating device described in Patent Literature 1, a washer fluid of the heat-retaining hot water storage chamber may be allowed to flow into the heating chamber by opening an outflow passage of the washer fluid at an upper part of the heating chamber. After the washer fluid is heated by the electric heater inside the heating chamber, the washer fluid is supplied to a washer nozzle by driving of a washer pump and sprayed from the washer nozzle.

CITATION LIST

Patent Literature

Patent Literature 1: Japanese Patent No. 5536680

SUMMARY OF INVENTION

Technical Problem

Incidentally, in a configuration in which the outflow passage is open in the heating chamber of the washer fluid heating device, an air layer may be formed above the washer fluid. In this case, a distal end portion of the heater may be exposed from the washer fluid when the vehicle is inclined while the washer fluid heating device is turned ON or the washer fluid heating device is obliquely attached. This exposed distal end portion causes a so-called no-water burning state, and steam of the washer fluid is generated when the washer fluid comes into contact with the distal end portion in this state. When the steam of the washer fluid is sprayed from the washer nozzle and cooled, the steam becomes white steam and a failure of the vehicle may be erroneously recognizes. In addition, a part of the heating means partially becomes hot, and thus the heating device is easily damaged.

An object of the invention is to provide a washer fluid heating device capable of preventing a phenomenon such as steaming from occurring and preventing damage to the heating device even when an air layer is formed above a washer fluid.

Solution to Problem

A washer fluid heating device of an aspect of the invention includes a container that contains a washer fluid, a lid portion attached to a first end of the container in a direction of a central axis line to face an accommodation space for the washer fluid, heating means that has a proximal end portion attached to the lid portion and extends toward the accommodation space, and an outflow pipe having an outlet disposed in the accommodation space to allow the washer fluid in the accommodation space to flow out, wherein the outlet is provided between a distal end surface of the heating means and a second end opposite to the first end of the container, and a region obtained by projecting the outlet onto a virtual plane perpendicular to the direction of the central axis line of the container at least partially overlaps a region obtained by projecting the distal end surface of the heating means onto the virtual plane.

According to the washer fluid heating device of the aspect of the invention, the lid portion is attached to the first end of the container, and the heating means, the proximal end portion of which is attached to the lid portion, extends in the accommodation space of the container. The outflow pipe having the outlet which allows the washer fluid in the accommodation space to flow out is disposed in the accommodation space of the container. The outlet is provided between the distal end surface of the heating means and the second end opposite to the first end of the container. In other words, when the washer fluid heating device is used, a distal end portion of the heating means is located in the washer fluid and is rarely exposed from the washer fluid. In addition, the projection region obtained by projecting the outlet onto the virtual plane perpendicular to the direction of the central axis line of the container at least partially overlaps the projection region obtained by projecting the distal end surface of the heating means onto the virtual plane. In this case, the distal end portion of the heating means is located on the first end side of the container from the horizontal plane passing through the outlet regardless of a direction in which the washer fluid heating device is inclined. Therefore, even when the washer fluid heating device is inclined, the distal end portion of the heating means is rarely exposed to an upper side of the washer fluid, and a phenomenon such as steaming may be prevented from occurring.

In addition, the outlet may be provided on an axis of the heating means. In this case, the outlet is located immediately above the heating means, and thus the phenomenon such as steaming is suppressed even when the washer fluid heating device is greatly inclined.

In addition, the outlet may be provided on the central axis line of the container. In this case, regardless of the direction in which the washer fluid heating device is inclined, the amount of the washer fluid contained in the container is not greatly reduced, and the washer fluid heating device may be efficiently used.

In addition, the outflow pipe may be fixed by a fixing member attached to the distal end portion of the heating means. In this case, since the distal end portion of the outflow pipe is fixed, a position of the outlet is stable. Therefore, a liquid level of the washer fluid is more stably maintained. In addition, since a relative position between the distal end portion of the heating means and the outlet is kept constant, it is possible to reduce a possibility that a distal end of the heating means will protrude to the air layer to cause a no-water burning state.

Effects of Invention

According to an aspect of the invention, a phenomenon such as steaming may be prevented even when an air layer is formed above a washer fluid.

DESCRIPTION OF EMBODIMENTS

Hereinafter, an embodiment of the invention will be described with reference to drawings. In description of the drawings, the same reference numeral will be assigned to the same element, and a repeated description will be omitted.

Figure 1:
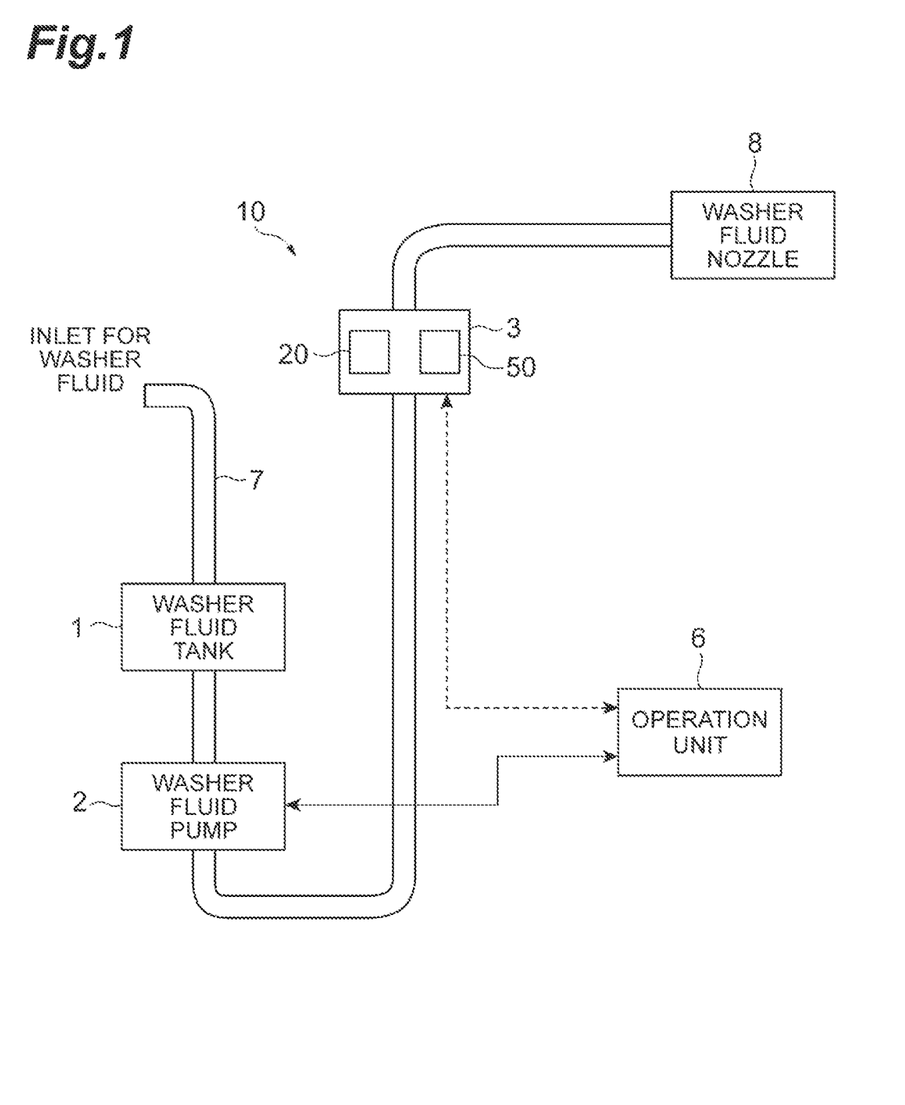
FIG. 1 is a diagram schematically illustrating a washer fluid supply system using an embodiment of the invention.

Hereinafter, a description will be given of an example in which a washer fluid heating device 3 according to an embodiment of the invention is applied to a washer fluid supply system of a vehicle. As illustrated in FIG. 1, a washer fluid supply system 10 includes a washer fluid tank 1 that stores a washer fluid, a washer fluid pump 2 provided at an outlet side of the washer fluid tank 1, and a washer fluid nozzle 8 provided to face a front windshield of the vehicle. The supply system 10 further includes the washer fluid heating device 3 provided between the washer fluid pump 2 and the washer fluid nozzle 8. An operation unit 6 is connected to the washer fluid pump 2 and the washer fluid heating device 3. The washer fluid pump 2 may be operated when the operation unit 6 is operated by a driver of the vehicle, etc. The above respective devices are connected by a pipe line 7. The washer fluid tank 1 is connected to an injection hole for the washer fluid through the pipe line 7.

Figure 2:
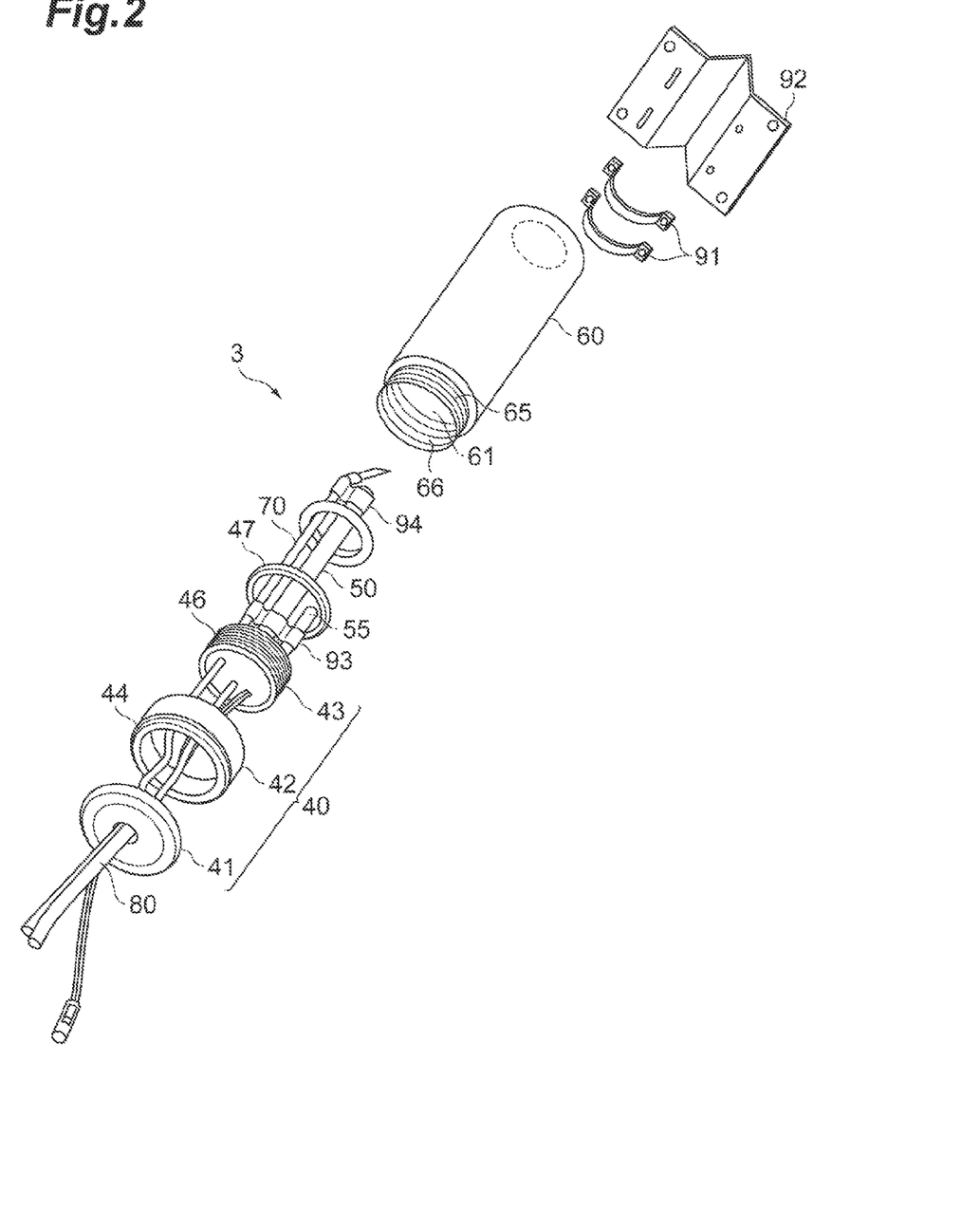
FIG. 2 is an exploded perspective view illustrating a washer fluid heating device of FIG. 1.
Figure 3:
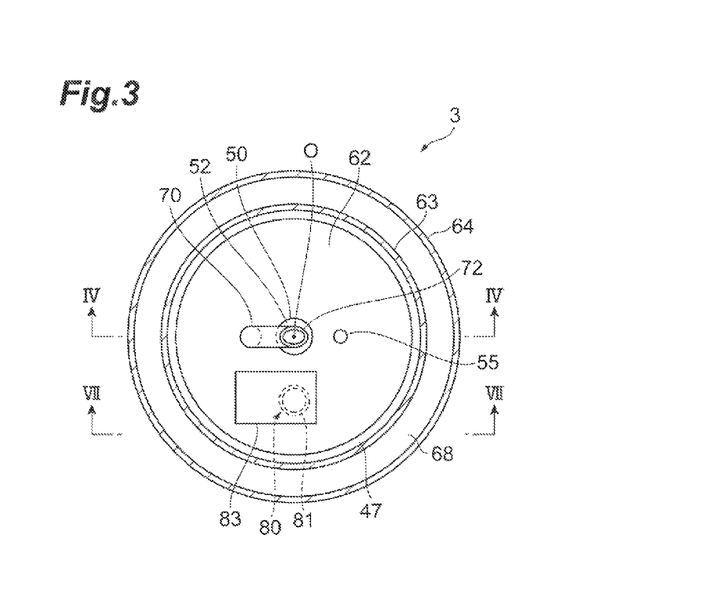
FIG. 3 is a planar cross-sectional view illustrating the washer fluid heating device of FIG. 1.
Figure 4:
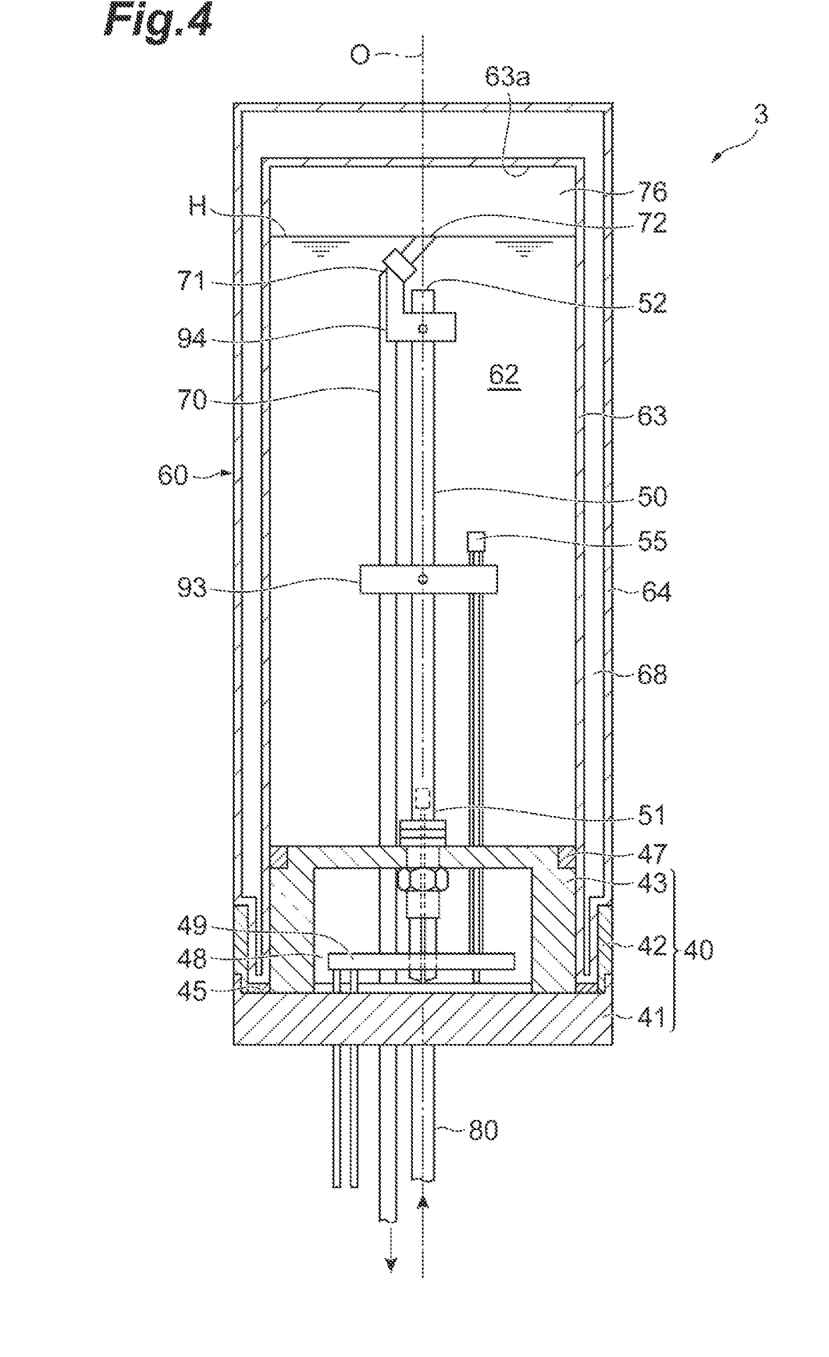
FIG. 4 is a cross-sectional view taken along IV-IV of FIG. 3.

As illustrated in FIG. 2 to FIG. 4, the washer fluid heating device 3 includes a cylindrical container 60, a lid portion 40 attached to a first end of the container 60 in a direction of a central axis line O to close an opening 61 of the container 60, and heating means 50 attached to the lid portion 40. The container 60 has a cylindrical accommodation space 62 that contains the washer fluid. A proximal end portion 51 of the heating means 50 is attached to the lid portion 40 and the heating means 50 extends toward the accommodation space 62 of the container 60. Here, the proximal end portion 51 of the heating means 50 corresponds to a portion of the heating means 50 on a first end side in the direction of the central axis line O.

The container 60 is fixed inside the vehicle by a plate-shaped support member 92 and a fixing band 91. The container 60 has a double structure similar to that of a thermos bottle and has a heat insulating structure for keeping the washer fluid in the accommodation space 62 warm. For example, an inner wall 63 of the container 60 is made of metal such as stainless steel, glass plated with metal, etc. An outer wall 64 of the container 60 is made of metal such as stainless steel. A vacuum layer 68 is formed between the inner wall 63 and the outer wall 64.

At the first end of the container 60 at which the opening 61 is formed, a screw portion 65 is formed on an outer peripheral surface thereof and a screw portion 66 is formed on an inner peripheral surface thereof. In the present embodiment, a term "lower" means the first end side with respect to the container 60, that is, the side of the lid portion 40.

The lid portion 40 faces the accommodation space 62 for the washer fluid and seals the accommodation space 62. The lid portion 40 includes an inner plug 43 facing the accommodation space 62, a cover 42 attached to the screw portion 65 provided on the outer peripheral surface of the opening 61, and an outer lid 41 attached to the cover 42 to cover a lower surface of the inner plug 43. The outer lid 41 is attached to the cover 42 by being screwed into a screw portion 44 formed on a lower side of an outer peripheral surface of the cover 42. Annular packing 45 (see FIGS. 4 and 5) is provided between the outer lid 41 and an end surface of the container 60 on the opening 61 side. For example, each member included in the lid portion 40 is made of a resin such as polyphenylene sulfide (PPS), polypropylene (PP), etc.

A screw portion 46 is formed on an outer peripheral surface of the inner plug 43. The inner plug 43 is attached to the container 60 by screwing the screw portion 46 and the screw portion 66 of the opening 61 of the container 60. A groove portion for mounting packing 47 is formed along an outer peripheral portion thereof on an upper surface of the inner plug 43. The opening 61 of the accommodation space 62 is sealed by the inner plug 43 and the packing 47. A depression 48 which is recessed to the accommodation space 62 side and open downward is formed in the inner plug 43. The depression 48 is filled with a resin such as urethane, and a control board 49 is buried therein.

The heating means 50 is mounted by the proximal end portion 51 thereof penetrating the inner plug 43. The heating means 50 extends toward a second end side opposite to the lid portion 40. An axis of the heating means 50 is located on the central axis line O of the container 60. A distal end surface 52 is formed on a distal end side of the heating means 50 in an axial direction. Here, a distal end portion of the heating means 50 refers to a portion on a distal end side of a central portion of a portion extending in the accommodation space 62. The distal end surface 52 of the heating means 50 has a planar shape. However, the distal end surface 52 may have a curved surface shape other than the planar shape such as a mountain shape, a depression, a projection, etc.

A temperature sensor 55 is provided around a central portion of the accommodation space 62 in an extending direction. The temperature sensor 55 is connected to the control board 49 accommodated in the depression 48 of the inner plug 43 by a lead wire. The lead wire of the temperature sensor 55 is held by a first holder 93 attached to the heating means 50 around the central portion of the accommodation space 62 in the extending direction.

The temperature sensor 55 measures a temperature around the central portion of the accommodation space 62. The temperature sensor 55 may measure a temperature, and examples thereof include a thermistor, a thermocouple, etc. The temperature sensor 55 measures a temperature of the washer fluid in the accommodation space 62 and outputs the measured temperature to the control board 49. Heating adjusting means 20 (see FIG. 1) controls ON/OFF of the heating means 50 based on the temperature measured by the temperature sensor 55. In this way, the temperature of the washer fluid in the accommodation space 62 is maintained at a desired temperature (for example, about 40° C.).

The container 60 is provided with an outflow pipe 70 for allowing the washer fluid to flow out and an inflow pipe 80 for allowing the washer fluid to flow in. The outflow pipe 70 is connected to the washer fluid nozzle 8 by the pipe line 7. The inflow pipe 80 and the outflow pipe 70 penetrate the lid portion 40 to extend in the accommodation space 62. The inflow pipe 80 is connected to the washer fluid pump 2 by the pipe line 7.

The outflow pipe 70 has a bent portion 71 bent to an upper side of the heating means 50 and an outlet 72 formed at a distal end of the bent portion 71. The outflow pipe 70 for the washer fluid is fixed around the central portion of the accommodation space 62 in the extending direction by the first holder 93 attached to the heating means 50. The bent portion 71 of the outflow pipe 70 is fixed by a second holder 94 (fixing member) attached to the distal end portion of the heating means 50. One end of the second holder 94 extends to the upper side of the heating means 50 to form an annular member. The annular member is fixed by allowing the bent portion 71 to pass therethrough. The second holder 94 is made metal, resin, etc. having heat resistance.

Figure 5:
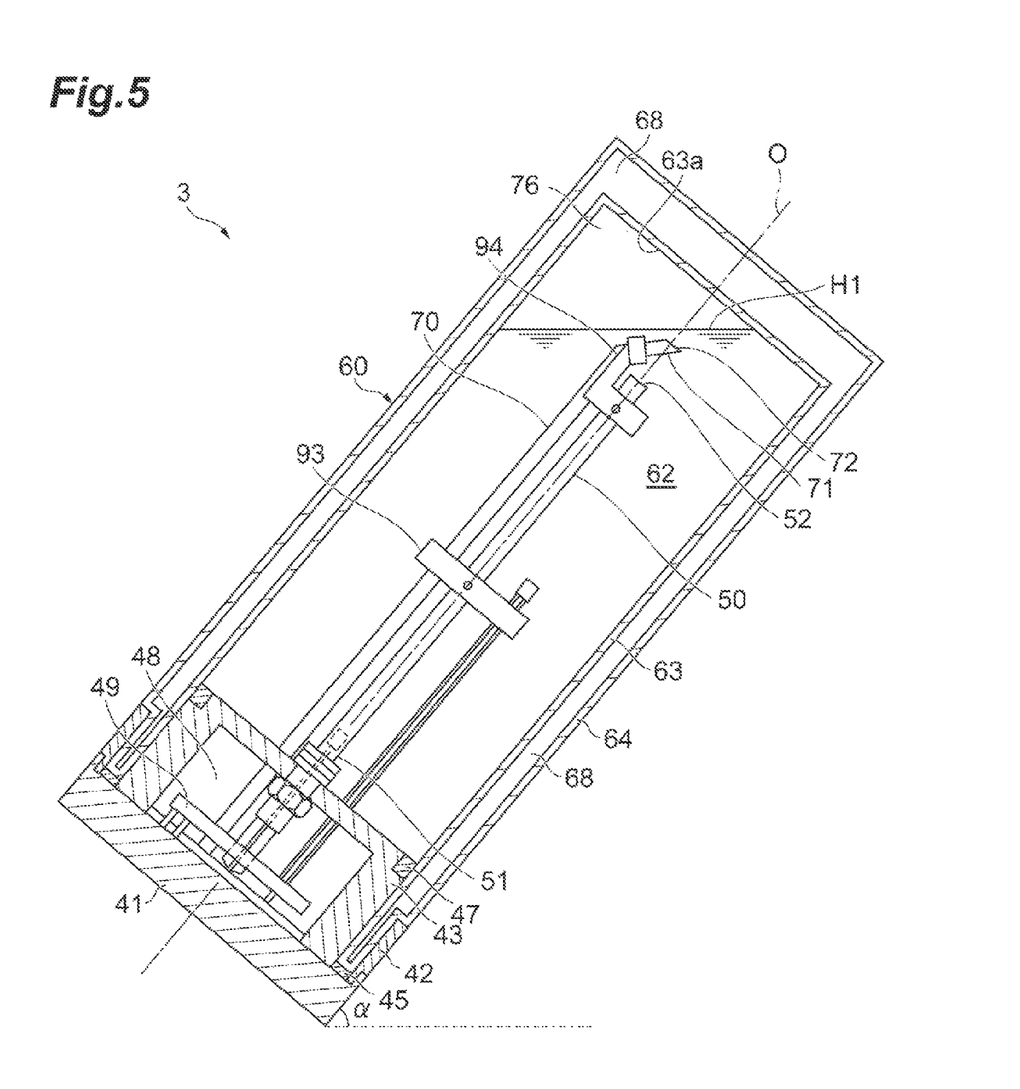
FIG. 5 is a side cross-sectional view illustrating a case in which the washer fluid heating device of FIG. 1 is inclined.
Figure 6A:
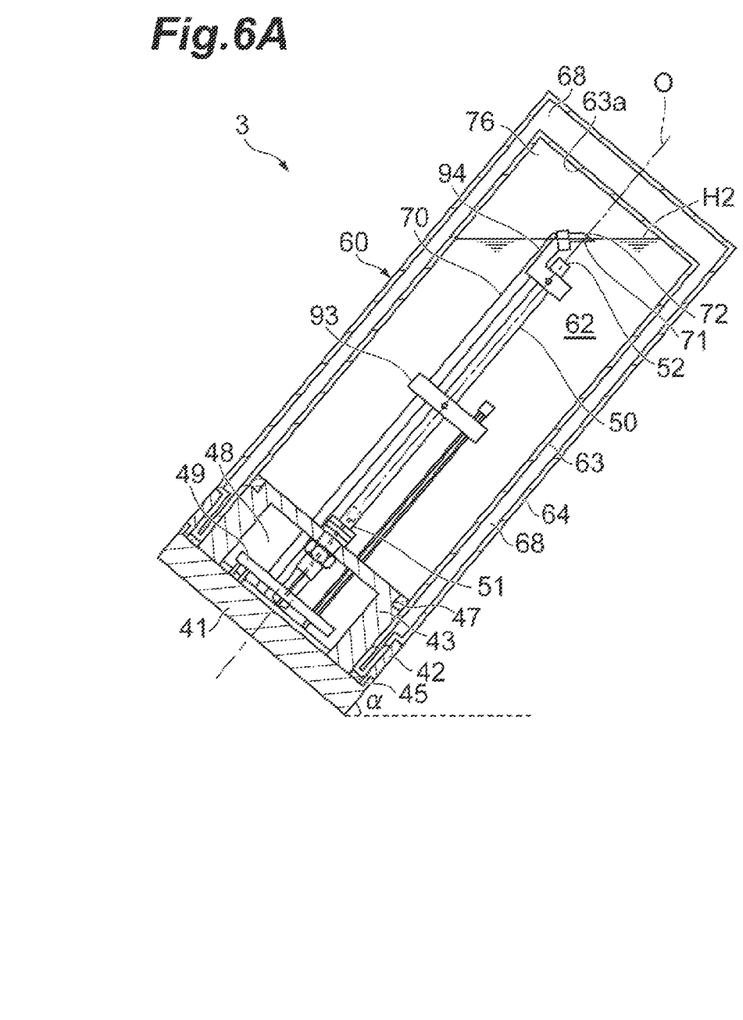
FIGS. 6A and 6B are side cross-sectional views illustrating a case in which the washer fluid heating device of FIG. 1 is inclined, and a liquid level of a washer fluid passes through an outlet.
Figure 6B:
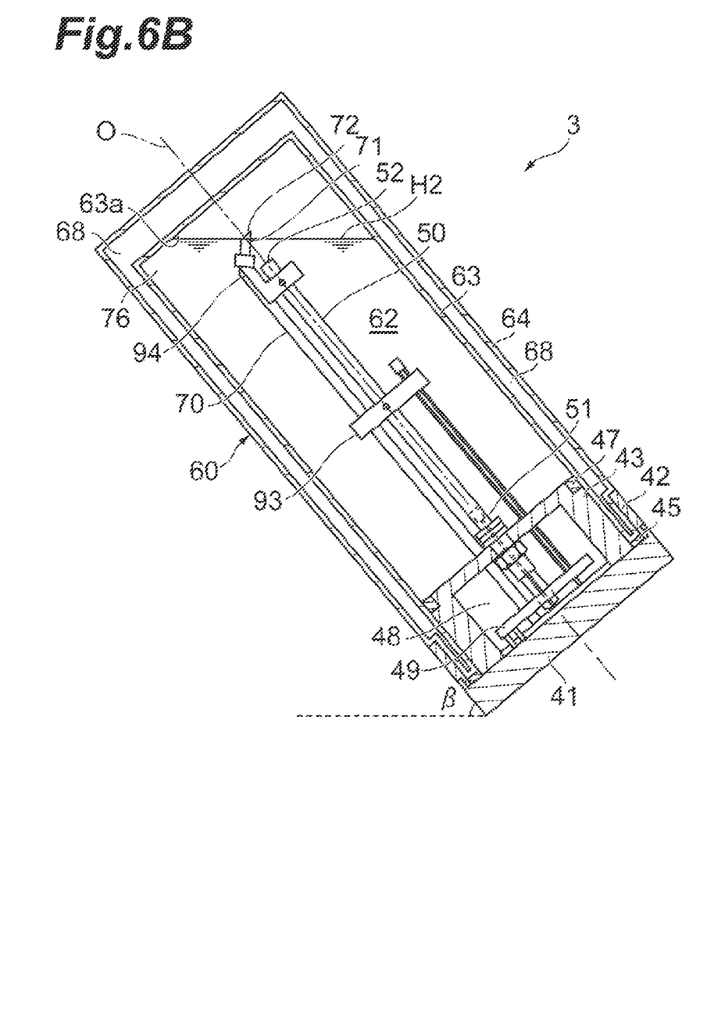

Next, a description will be given of the outlet 72 that allows the washer fluid to flow out, the distal end surface 52 of the heating means 50, and a liquid level H of the washer fluid with reference to FIG. 3 to FIG. 6. FIG. 3 is a planar cross-sectional view illustrating the washer fluid heating device of FIG. 1. FIG. 4 is a cross-sectional view taken along IV-IV of FIG. 3. FIG. 5 is a side cross-sectional view illustrating a case in which the washer fluid heating device 3 of FIG. 1 is inclined. FIGS. 6A and 6B are side cross-sectional views illustrating a case in which the washer fluid heating device of FIG. 1 is inclined, and a liquid level of a washer fluid passes through an outlet.

The outlet 72 of the outflow pipe 70 is located at an upper side of the accommodation space 62. The outlet 72 forms an annular shape extending along a surface perpendicular to the central axis line O of the container. In addition, the outlet 72 is located at a position at which the washer fluid is 90% or less of a volume of the accommodation space 62 in a vertical direction of the container 60. That is, a flat cylindrical space 76 formed by a horizontal plane passing through the outlet 72 and an inner wall surface 63a of the accommodation space 62 on the second end side corresponds to 10% or more of the volume of the accommodation space 62. This space 76 corresponds to an air layer above the washer fluid.

Here, a description will be given a positional relation between the outlet 72 and the distal end surface 52 of the heating means 50. The outlet 72 is provided between the distal end surface 52 of the heating means 50 and the second end of the container 60 in the accommodation space 62. In other words, the outlet 72 is separated from the lid portion 40 more than the distal end surface 52 of the heating means 50. A region obtained by projecting the outlet 72 onto a virtual plane perpendicular to the central axis line O of the container 60 is included in a region obtained by projecting the distal end surface 52 of the heating means 50 onto the virtual plane perpendicular to the central axis line O of the container 60 (see FIG. 3). That is, the region obtained by projecting the outlet 72 onto the virtual plane perpendicular to the central axis line O of the container 60 overlaps a part of the region obtained by projecting the distal end surface 52 of the heating means 50 onto the virtual plane perpendicular to the central axis line O of the container 60. In addition, the outlet 72 is disposed to be located on the axis of the heating means 50. That is, the outlet 72 is disposed to be located directly above the distal end surface 52 of the heating means 50 in the direction of the central axis line O of the container 60.

As illustrated in FIG. 4, the liquid level H of the washer fluid stored in the accommodation space 62 of the container 60 substantially matches the horizontal plane passing through the outlet 72. The liquid level H of the washer fluid stored in the accommodation space 62 of the container 60 refers to a normal water level of the washer fluid when the washer fluid pump 2 is in an OFF state. When the washer fluid pump 2 is used, air corresponding to a compressive fluid may be compressed and the washer fluid may be maintained above liquid level H of the washer fluid. In addition, when the vehicle is tilted while the washer fluid pump 2 is in the OFF state, the liquid level of the washer fluid stored in the accommodation space 62 of the container 60 is, for example, a liquid level H1 as illustrated in FIG. 5. In this case, a space 76 having a volume of 10% or more of the volume of the accommodation space 62 is formed between the liquid level H1 and the inner wall surface 63a of the accommodation space on the second end side. A shape of the space 76 corresponds to a shape obtained by obliquely cutting out a part of a ridge portion of a cylinder.

FIG. 5 illustrates a state in which the washer fluid heating device 3 is inclined by an angle α, for example, 40° with respect to a horizontal plane. As illustrated in FIG. 5, the liquid level H1 of the washer fluid is formed above the outlet 72. The outlet 72 is located above the distal end surface 52 of the heating means 50. In other words, the distal end surface 52 of the heating means 50 is located below the liquid level H1 of the washer fluid and is not exposed from the liquid level of the washer fluid. In addition, the liquid level H1 of the washer fluid may be maintained without change. However, in some cases, air may enter the container 60 through the inlet 81 or the outlet 72, so that a liquid level H2 of the washer fluid is formed to pass through the outlet 72 as illustrated in FIG. 6A. In this case, the distal end surface 52 of the heating means 50 is located below the liquid level H2 of the washer fluid and is not exposed from the liquid level of the washer fluid. The liquid level of the washer liquid formed along the horizontal plane passing through the outlet 72 is a lowest liquid level among liquid levels that can be formed in the accommodation space 62 inside the container 60.

In addition, as illustrated in FIG. 6B, the washer fluid heating device 3 may be inclined by an angle β, for example, 40° with respect to the horizontal plane in an opposite direction to that of the above example. In this case, the distal end surface 52 of the heating means 50 is located below the liquid level H2 of the washer fluid passing through the outlet 72. That is, the distal end surface 52 of the heating means 50 is located below a liquid level formed along the horizontal plane passing through the outlet 72 (the lowest liquid level among liquid levels that can be formed) regardless of a direction in which the washer fluid heating device 3 is inclined.

Even when the washer fluid heating device 3 illustrated in FIG. 4 is inclined, the space 76 formed above the horizontal plane passing through the outlet 72 corresponds to 10% or more of the volume of the accommodation space 62. Examples of a case in which the washer fluid heating device 3 is inclined include a case in which the vehicle is inclined with respect to the horizontal plane or a case in which the washer fluid heating device 3 is obliquely attached to the vehicle. For example, when the washer fluid heating device 3 is obliquely attached at 25° with respect to the horizontal plane of the vehicle and the vehicle is further inclined by 25° with respect to the horizontal plane in the same direction, the washer fluid heating device 3 is inclined by 50° in total with respect to the horizontal plane.

Here, a steaming phenomenon that can occur in a conventional washer fluid heating device will be described. In a process of using the washer fluid heating device, a washer fluid flowing into an accommodation space is heated by heating means, then flows into an outlet and is sent to the outside of a container. That is, when the outlet is formed in the accommodation space, an air layer may be formed in an upper part of the accommodation space. In this case, steam of the washer fluid is generated when the heating means is overheated while a distal end portion of the heating means is exposed from a liquid level of the washer fluid since a vehicle is inclined in a state in which the washer fluid heating device is turned ON or the washer fluid heating device is obliquely attached. When the steam of the washer fluid is sprayed from a washer fluid nozzle via the outlet, the steam is cooled around the washer fluid nozzle and becomes white steam.

Even though this steam is not a phenomenon caused by a failure of the vehicle, a user of the vehicle, etc. may erroneously recognize that a failure has occurred in the vehicle. In the washer fluid heating device 3, the above-described steaming phenomenon may be prevented by positioning the distal end surface 52 of the heating means 50 below the lowest liquid level of the washer fluid regardless of a direction in which the container 60 is inclined. In other words, the outlet 72 is provided between the distal end surface 52 of the heating means 50 and the second end opposite to the first end of the container 60. Then, the outlet 72 and the distal end surface 52 of the heating means 50 are disposed such that the projection region obtained by projecting the outlet 72 onto the virtual plane perpendicular to the direction of the central axis line O of the container 60 partially overlaps the projection region obtained by projecting the distal end surface 52 of the heating means 50 onto the virtual plane perpendicular to the direction of the central axis line O of the container 60. According to this configuration, the distal end portion of the heating means 50 is located below the liquid level of the washer fluid regardless of the direction in which the washer fluid heating device 3 is inclined, and the steam, etc. is prevented from being generated.

Figure 7:
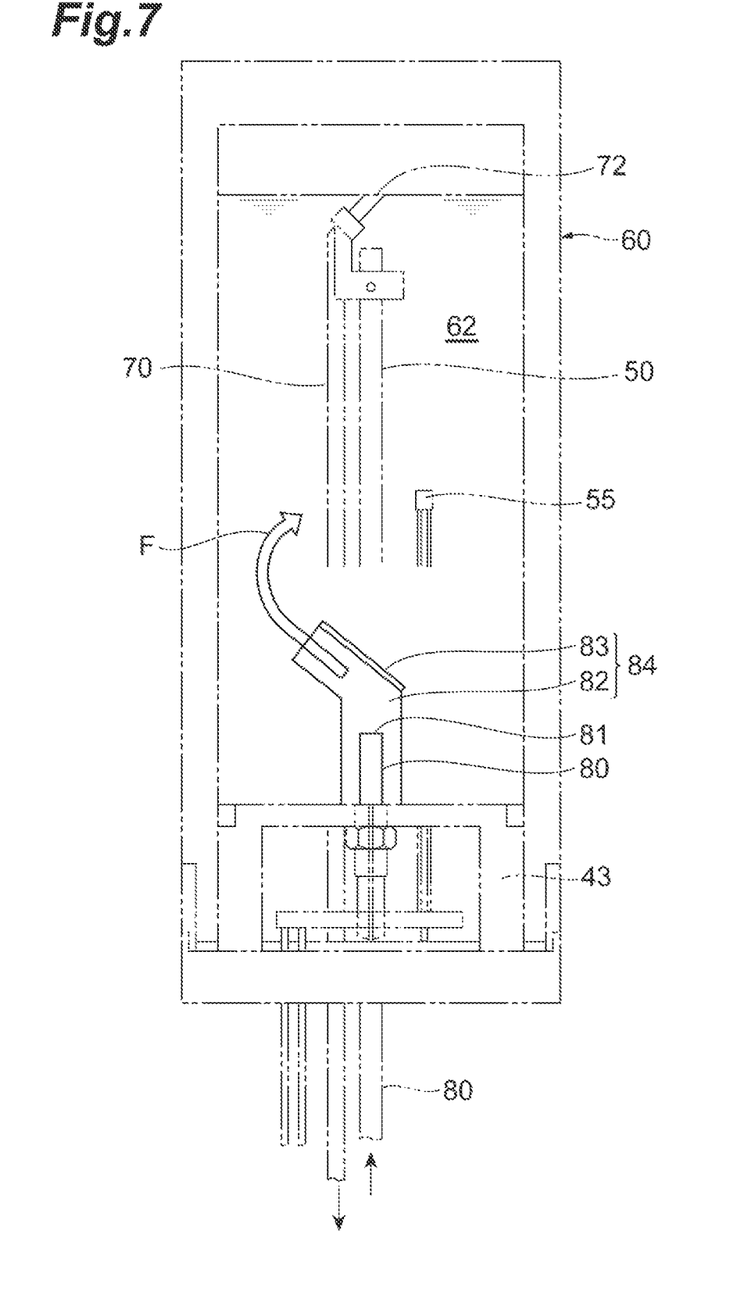
FIG. 7 is a cross-sectional view taken along VII-VII of FIG. 3 and is a schematic view illustrating an inlet and a current plate of the washer fluid heating device.

Hereinafter, the inflow pipe for washer fluid and a current plate will be described with reference to FIG. 3 and FIG. 7. FIG. 3 is a planar cross-sectional view illustrating the washer fluid heating device of FIG. 1. FIG. 7 is a cross-sectional view taken along VII-VII of FIG. 3 and is a schematic view illustrating the inlet and a current plate of the washer fluid heating device.

As illustrated in FIG. 3, the inflow pipe 80 (an inlet 81) for the washer fluid is disposed on one side of a virtual plane connecting center axes of the outflow pipe 70 for the washer fluid and the heating means 50. The inflow pipe 80 for the washing fluid penetrates the lid portion 40 and extends in the accommodation space 62. The inlet 81 is formed at a distal end of the inflow pipe 80 for the washing fluid. The inlet 81 is disposed in a substantially lower half portion in the vertical direction of the accommodation space 62. A current plate 83 of a rectification member 84 (see FIG. 7) is disposed above the inlet 81 to cover the inlet 81 when viewed from above.

The rectification member 84 has a standing plate 82 attached to the inner plug 43 and the current plate formed by bending the standing plate 82. The standing plate 82 is disposed between the heating means 50 and the inflow pipe 80 to be parallel to the virtual plane connecting the center axes of the outflow pipe 70 and the heating means 50. An upper end portion of the standing plate 82 is bent toward the inner wall 63 side to cover the inlet 81, thereby forming the current plate 83.

As illustrated in FIG. 7, the current plate 83 is located above the inlet 81 and below the outlet 72. That is, the current plate 83 is disposed between the inlet 81 and the outlet 72. An inclined direction of the current plate 83 is parallel to a virtual plane formed by the axis of the outflow pipe 70 for the washer fluid and the central axis line O of the container 60, and is inclined toward an opposite side to the outflow pipe 70 with respect to the central axis line O. Here, the inclined direction of the current plate 83 is a normal direction of a plane forming the current plate 83.

Here, a description will be given of a process after the washer fluid flows into the accommodation space 62 of the container 60 in the washer fluid heating device 3. The washer fluid sent by the washer fluid pump 2 is sprayed into the accommodation space 62 from the inlet 81 through the inflow pipe 80. The washer fluid after spraying collides with the current plate 83 of the rectification member 84 by momentum. The current plate 83 changes a flow direction of the washer fluid to rise obliquely along a tilt direction of the current plate 83. The washer fluid guided to a side of the container 60 to flow up to the inner wall 63 continues to flow along the inner wall 63 while rising in an oblique direction. As a result, the washer fluid flows to rise along a helical direction F from the first end side to the second end side in the accommodation space 62 inside the container 60. The washer fluid flowing in from the inlet 81 moves toward the outlet 72 while successively pushing up the heated washer fluid without directly heading for the outlet 72 by rising along the helical direction F. In addition, the washer fluid flowing in from the inlet 81 stays in the accommodation space 62 for a long time and is sufficiently heated.

Next, a description will be given of a method of operating the washer fluid supply system 10 using the washer fluid heating device 3 of the present embodiment.

For example, the washer fluid heating device 3 operates when the driver, etc. turns ON an ignition key. In this way, the washer fluid in the accommodation space 62 is heated to a desired temperature by the heating means 50. Subsequently, when an operation command is delivered to the washer fluid pump 2 by the driver, etc. operating the operation unit 6, the washer fluid stored in the washer fluid tank 1 is supplied to the washer fluid heating device 3 by the washer fluid pump 2 and flows into the accommodation space 62 of the heating device 30 through the inflow pipe 80 for the washer fluid. In the accommodation space 62, the washer fluid flowing in from the inlet 81 is heated while spirally rising. At the same time, the washer fluid successively raises the heated washer fluid present in an upper part of the accommodation space 62. As a result, the heated washer fluid flows into the outlet 72 of the outflow pipe 70 for the washer fluid disposed in an upper region of the accommodation space 62. The washer fluid in the outflow pipe 70 is delivered to the washer fluid nozzle 8 via the pipe line 7 by driving the washer fluid pump 2. Through this series of operations, a warmed washer fluid is supplied to the front windshield of vehicle.

Here, in the accommodation space 62 that contains the washer fluid, the distal end surface 52 of the heating means 50 is located below the horizontal plane passing through the outlet 72. That is, the distal end surface 52 of the heating means 50 is located below the lowest liquid level among the liquid levels that can be formed in the accommodation space 62. Therefore, the steaming phenomenon may be prevented from occurring even when the washer fluid heating device 3 is inclined.

According to the above-described washer fluid heating device 3 of the present embodiment, the lid portion 40 is attached to the first end of the container 60, and the heating means 50, the proximal end portion 51 of which is attached to the lid portion 40, extends in the accommodation space 62 of the container 60. The outflow pipe 70 having the outlet 72 that allows the washer fluid in the accommodation space 62 to flow out is disposed in the accommodation space 62 of the container 60. The outlet 72 is provided between the distal end surface 52 of the heating means 50 and the second end opposite to the first end of the container 60. In addition, the projection region obtained by projecting the outlet 72 onto the virtual plane perpendicular to the direction of the central axis line O of the container 60 overlaps a part of the projection region obtained by projecting the distal end surface 52 of the heating means 50 onto the virtual plane perpendicular to the direction of the central axis line O of the container 60. In this case, the distal end surface 52 of the heating means 50 is located on the first end side of the container 60 from the horizontal plane passing through the outlet 72 regardless of the direction in which the washer fluid heating device 3 is inclined. Therefore, even when the washer fluid heating device 3 is inclined, the distal end portion of the heating means 50 is rarely exposed to an upper side of the washer fluid, and a phenomenon such as steaming may be prevented from occurring. In addition, the distal end portion of the heating means 50 may be prevented from protruding to the air layer to cause a no-water burning state.

In addition, the outlet 72 is provided on the axis of the heating means 50. In other words, since the outlet 72 is located immediately above the heating means 50, the phenomenon such as steaming may be suppressed even when the washer fluid heating device 3 is greatly inclined.

In addition, the outlet 72 is provided on the central axis line O of the container 60. For this reason, regardless of the direction in which the washer fluid heating device 3 is inclined, the amount of the washer fluid contained in the container 60 is not greatly reduced, and the washer fluid heating device 3 may be efficiently used.

In addition, since the outflow pipe 70 is fixed to the second holder 94 (fixing member) attached to the distal end portion of the heating means 50, a distal end portion of the outflow pipe 70 is fixed, a position of the outlet 72 is stable, and the liquid level of the washer fluid is more stably maintained. In addition, since a relative position between the distal end portion of the heating means 50 and the outlet 72 is kept constant, the distal end portion of the heating means 50 may be more reliably prevented from protruding to the air layer to cause the no-water burning state.

Hereinbefore, the present embodiment has been described. However, the invention is not limited to the above-described embodiment, and various modified embodiments can be adopted. For example, instead of forming the outlet 72 perpendicular to the central axis line O of the container 60, a notch, etc. may be formed in a part of a distal end of the outflow pipe 70, or the outlet 72 may be inclined with respect to the central axis line O. In this case, similarly to a case in which the outlet 72 is perpendicular to the central axis line O, the steaming phenomenon, etc. is suppressed when the distal end surface 52 of the heating means 50 is located below the horizontal plane passing through the outlet 72.

In addition, a part of the projection region obtained by projecting the outlet 72 onto the virtual plane perpendicular to the direction of the central axis line O of the container 60 may overlap a part of the projection region obtained by projecting the distal end surface 52 of the heating means 50 onto the virtual plane perpendicular to the direction of the central axis line O of the container 60. In this case, similarly to the above-described embodiment, regardless of the direction in which the washer fluid heating device 3 is inclined, the steaming phenomenon, etc. is suppressed when the distal end portion of the heating means 50 is located below the horizontal plane passing through the outlet 72.

In addition, in the above embodiment, the outflow pipe 70 is fixed by the fixing member attached to the heating means 50. However, the fixing member may not be provided when the outflow pipe 70 is made of a hard material, etc. Further, in the above embodiment, the container 60 and the accommodation space 62 are cylindrical. However, the invention is not limited thereto. For example, each of the container 60 and the accommodation space 62 may have a polygonal columnar shape or an elliptical columnar shape.

In the above embodiment, the outlet 72 is located immediately above the distal end surface 52 of the heating means 50 by bending the distal end portion of the outflow pipe 70. However, the outlet 72 may be located immediately above the heating means 50 by obliquely disposing the outflow pipe 70 with respect to the heating means 50. In addition, the outlet 72 may not be located immediately above the distal end surface 52 of the heating means 50.

In the above embodiment, the heating means 50 is disposed such that the axis of the heating means 50 is located on the central axis line O of the container 60. However, the invention is not limited thereto. For example, the heating means 50 may be obliquely attached with respect to the central axis line of the container 60.

INDUSTRIAL APPLICABILITY

According to an aspect of the invention, a phenomenon such as steaming may be prevented even when an air layer is formed above a washer fluid.

REFERENCE SIGNS LIST

3 . . . washer fluid heating device, 40 . . . lid portion, 50 . . . heating means, 51 . . . proximal end portion, 52 . . . distal end surface of heating means, 60 . . . container, 62 . . . accommodation space, 63 . . . inner wall, 70 . . . outflow pipe, 72 . . . outlet, 80 . . . inflow pipe, 81 . . . inlet, 83 . . . current plate, 94 . . . second holder, O . . . central axis line of container.

The invention claimed is:

1. A washer fluid heating device comprising:
    a container that contains a washer fluid;
    a lid portion attached to a first end of the container in a direction of a central axis line to face an accommodation space for the washer fluid;
    a heater that has a proximal end portion attached to the lid portion and a distal end portion which extends toward the accommodation space; and
    an outflow pipe which is offset from the central axis line of the container, a bent portion of the outflow pipe having an outlet disposed in the accommodation space to allow the washer fluid in the accommodation space to flow out,
    wherein the outlet of the outflow pipe is located between the distal end portion of the heater and a second end of the container opposite to the first end of the container, and
    a region obtained by projecting the outlet onto a virtual plane perpendicular to the direction of the central axis line of the container at least partially overlaps a region obtained by projecting the distal end portion of the heater onto the virtual plane.

2. The washer fluid heating device according to claim 1, wherein the outlet is located on an axis line of the heater.

3. The washer fluid heating device according to claim 1, wherein the outlet of the outflow pipe is located on the central axis line of the container.

4. The washer fluid heating device according to claim 1, wherein the bent portion of the outflow pipe is fixed by a fixing member attached to the distal end portion of the heater.

5. The washer fluid heating device according to claim 1, wherein the distal end portion of the heater extends along the central axis line of the container.

6. A washer fluid heating device comprising:
- a container that contains a washer fluid;
- a lid portion attached to a first end of the container in a direction of a central axis line to face an accommodation space for the washer fluid;
- a heater that has a proximal end portion attached to the lid portion and a distal end portion which extends along a longitudinal axis of the heater toward the accommodation space; and
- an outflow pipe which is offset from the longitudinal axis of the heater and which includes a bent portion having an outlet disposed in the accommodation space to allow the washer fluid in the accommodation space to flow out,
- wherein the outlet of the outflow pipe is located on the longitudinal axis of the heater between the distal end portion of the heater and a second end of the container opposite to the first end of the container.

7. The washer fluid heating device according to claim 6, wherein the longitudinal axis of the heater is parallel to the central axis line of the container.

8. The washer fluid heating device according to claim 6, wherein the outlet of the outflow pipe is located on the central axis line of the container.

9. The washer fluid heating device according to claim 6, wherein the bent portion of the outflow pipe is fixed by a fixing member attached to the distal end portion of the heater.

10. The washer fluid heating device according to claim 6, wherein a region obtained by projecting the outlet onto a virtual plane perpendicular to the direction of the central axis line of the container at least partially overlaps a region obtained by projecting the distal end portion of the heater onto the virtual plane.

* * * * *